United States Patent
Koenig et al.

(10) Patent No.: US 11,332,092 B2
(45) Date of Patent: May 17, 2022

(54) METHOD FOR GENERATING A TRIGGER SIGNAL FOR TRIGGERING AT LEAST ONE SAFETY FUNCTION OF A MOTOR VEHICLE

(71) Applicant: Robert Bosch GmbH, Stuttgart (DE)

(72) Inventors: Simon Koenig, Moeckmuehl (DE); Gunther Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 16/650,086

(22) PCT Filed: Sep. 19, 2018

(86) PCT No.: PCT/EP2018/075322
§ 371 (c)(1),
(2) Date: Mar. 24, 2020

(87) PCT Pub. No.: WO2019/063381
PCT Pub. Date: Apr. 4, 2019

(65) Prior Publication Data
US 2020/0290539 A1   Sep. 17, 2020

(30) Foreign Application Priority Data

Sep. 26, 2017 (DE) .......................... 102017217013.1

(51) Int. Cl.
*B60W 40/10* (2012.01)
*B60R 21/0136* (2006.01)
*B60R 21/0132* (2006.01)

(52) U.S. Cl.
CPC ...... *B60R 21/0136* (2013.01); *B60R 21/0132* (2013.01); *B60W 40/10* (2013.01);
(Continued)

(58) Field of Classification Search
CPC ................................................ B60W 2422/90
See application file for complete search history.

(56) References Cited

U.S. PATENT DOCUMENTS 9,221,414 B2 * 12/2015 Schondorf .............. B60R 19/18
10,259,412 B1 * 4/2019 Krishnappa ........... B60R 19/483
(Continued)

FOREIGN PATENT DOCUMENTS

DE        103 09 081 A1    9/2004
DE   10 2004 012 550 A1   10/2005
(Continued)

OTHER PUBLICATIONS

International Search Report corresponding to PCT Application No. PCT/EP2018/075322, dated Jan. 17, 2019 (German and English language document) (7 pages).

*Primary Examiner* — Peter D Nolan
*Assistant Examiner* — Ce Li Li
(74) *Attorney, Agent, or Firm* — Maginot, Moore & Beck LLP

(57) ABSTRACT

A method for generating a trigger signal for triggering at least one safety function of a motor vehicle includes receiving respective signals from at least two pressure tube sensors; determining a minimum size of a collision object and/or a speed of the motor vehicle from the signals received, and emitting the trigger signal for the at least one safety function in accordance with at least one of the parameters.

10 Claims, 3 Drawing Sheets

(52) U.S. Cl.
 CPC ........... *B60W 2554/4041* (2020.02); *B60W 2554/4042* (2020.02); *B60W 2554/4044* (2020.02)

(56) References Cited

U.S. PATENT DOCUMENTS

| | | | |
|---|---|---|---|
| 2013/0079995 A1 | 3/2013 | Kula et al. | |
| 2015/0274118 A1* | 10/2015 | Schondorf | G01N 3/30 701/45 |
| 2015/0291122 A1* | 10/2015 | Seo | B60R 21/0136 701/45 |
| 2015/0314744 A1* | 11/2015 | Lang | B60R 21/013 340/436 |

FOREIGN PATENT DOCUMENTS

| | | |
|---|---|---|
| DE | 10 2012 210 233 A1 | 12/2013 |
| DE | 10 2013 202 205 A1 | 8/2014 |
| DE | 10 2014 113 739 A1 | 4/2015 |
| DE | 10 2014 208 649 A1 | 11/2015 |
| DE | 10 2015 226 752 A1 | 7/2017 |
| JP | 2007-118830 A | 5/2007 |
| JP | 2015-74422 A | 4/2015 |
| JP | 2016-203775 A | 12/2016 |

\* cited by examiner

METHOD FOR GENERATING A TRIGGER SIGNAL FOR TRIGGERING AT LEAST ONE SAFETY FUNCTION OF A MOTOR VEHICLE

This application is a 35 U.S.C. § 371 National Stage Application of PCT/EP2018/075322, filed on Sep. 19, 2018, which claims the benefit of priority to Serial No. DE 10 2017 217 013.1, filed on Sep. 26, 2017 in Germany, the disclosures of which are incorporated herein by reference in their entirety.

BACKGROUND

For several years now, pressure tube sensors (PTS) have been used in order to detect an impact with a pedestrian on a front side of a motor vehicle. The pressure tube is in this case normally located between a bumper crossbeam and absorption foam situated in front thereof. The pressure tube is filled with air and sealed at each of its ends with a respective pressure sensor. The deformation in the foam that occurs in the event of an impact with a pedestrian thus leads to the tube being compressed, as a result of which a pressure signal is measured by the two pressure sensors. This is read by a controller, generally the central airbag controller, and processed there in order to detect an impact with a pedestrian.

SUMMARY

A particularly advantageous method for generating a trigger signal for triggering at least one safety function of a motor vehicle is proposed here. The dependent claims specify particularly advantageous developments of the method.

The recording of collisions with pedestrians is in particular able to be improved by way of the described method. A minimum size of a collision object may thus in particular be determined and/or a collision speed may be verified. This may be used in particular for improved pedestrian protection detection and to trigger safety functions, such as for example restraint means. Determining the minimum size of the collision object may in particular allow a much more accurate distinction between objects that are usually small and do not trigger pedestrian protection and considerably larger trigger objects (such as for example what are known as leg impactors).

At least two pressure tube sensors are provided for the described method. The size of a collision object may in particular be determined on the basis of these sensors. Up until now, it was possible only to detect the mass from the pressure signal from a pressure tube sensor. By virtue of (at least) one further pressure tube sensor, detection for pedestrian protection is supplemented by a spatial component. The (at least one) further pressure tube sensor may also make it possible to determine the motor vehicle's own speed in the collision.

A system with two pressure tube sensors (that is to say a 2-PTS system) is preferably used for the described method. The pressure tube sensors are preferably arranged at a spatial distance from one another. In the case of an arrangement comprising two pressure tube sensors, this is in particular a system with two well-defined contact switches (the pressure tube sensors). The pressure tube sensors are preferably arranged in an (in particular front) crumple zone of the motor vehicle. The minimum size of a collision object and/or the motor vehicle's own speed in the collision may thereby be determined.

The described method in particular comprises method steps a) to c), which are preferably performed in the specified order.

In step a) of the described method, respective signals are received from at least two pressure tube sensors.

The pressure tube sensors preferably each have an air-filled tube (for example made from a material comprising silicone) that is sealed at one end, preferably at both ends, by way of a pressure sensor. It is assumed hereinafter by way of example that two pressure sensors are provided per pressure tube sensor. The pressure sensors may be used to record data, from which it is possible to conclude as to an impact on the tube. Appropriate electronics may in particular be used to generate a signal from the pressure tube sensor from these data. The signal may in this case in particular indicate the fact that an impact with the pressure tube sensor has been recorded. The time at which the signal is output may specify the time of the impact (possibly delayed by a processing time). As an alternative, the signal may also be output continuously and be changed in a predefined manner when an impact is recorded.

The signals from the at least two pressure tube sensors are preferably received by a controller that is designed and configured so as to perform the described method.

In step b) of the described method, a minimum size of a collision object and/or the motor vehicle's own speed is determined from the signals received in step a).

In the event of an impact with a collision object, the at least two pressure tube sensors are deformed. A minimum size of the collision object and/or the motor vehicle's own speed in the collision may be determined therefrom.

Using the obtained minimum size of the collision object and/or using the motor vehicle's obtained own speed in the collision, it is possible for example to influence the sensitivity of a pedestrian protection algorithm. In particular, for this purpose, in step c) of the described method, the trigger signal for the at least one safety function is output depending on at least one parameter determined in step b).

The at least one safety function may be for example an active hood, an external airbag, an airbag, a seatbelt tensioner or an intervention in the control of the motor vehicle (for example through an automatic emergency braking operation and/or an automatically initiated avoidance maneuver). The motor vehicle preferably comprises a multiplicity of safety functions. The at least one safety function may in particular be triggered by a trigger signal that is preferably in particular output by the controller. By virtue of step c) of the described method, the parameter output in step b) is taken into consideration when triggering the at least one safety function. The time and/or the type of triggering of the at least one safety function may thus be determined depending on the parameter. It is also possible to determine whether the at least one safety function actually needs to be triggered at all. In the case of a plurality of safety functions, it is additionally possible to select safety functions to be triggered and/or to decide the order in which these need to be triggered.

The at least one parameter output in step c) may in particular be the minimum size of the collision object (or the information that a collision object attains the minimum size) and the motor vehicle's own speed in the collision.

The determined features, that is to say in particular the minimum size of the collision object and/or the motor vehicle's own speed, may in particular be used to determine actuation of the safety functions (that is to say in particular of restraint means for pedestrian protection). Said determined features constitute central parameters for distinguishing between pedestrian crashes, and may therefore be used to determine the actuation of the corresponding safety functions. By way of example, the sensitivity of a pedestrian protection algorithm may be influenced by the minimum size of the collision object.

In one preferred embodiment of the method, the signals from the at least two pressure tube sensors received in step a) each represent at least one of the following parameters:
an impact time $t_1$, $t_2$ and
an impact location $s_1$, $s_2$.

The received signals representing said parameters impact time ($t_1$, $t_2$) and impact location ($s_1$, $s_2$) is in particular understood to mean that the received signals contain information from which said parameters are able to be determined. Pressure profiles with regard to the are preferably received from the pressure tube sensors in step a). It is then possible to calculate an impact time ($t_1$, $t_2$) and an impact location ($s_1$, $s_2$) from these pressure profiles in a controller (preferably in the controller in which the further method steps are also executed).

In the event of an impact with an obstacle, the first pressure tube (at the time t) and the second pressure tube (at the time $t_2$) are deformed. Depending on the arrangement of the pressure tube sensors, the time $t_1$ may be before or after the time $t_2$ or also coincide therewith. Both deformations lead to an immediate pressure increase and therefore pressure signal at the pressure sensors adjoining the respective pressure tubes. The respective times $t_1$ and $t_2$ may be detected in the controller, for example by threshold values being exceeded in a respective first pressure sensor of the respective pressure tube sensor.

The impact time $t_1$ or $t_2$ should be understood to mean the time at which an impact with the first or second pressure tube sensor is detected. The impact location $s_1$ or $s_2$ is the location at which the impact with the first or second pressure tube sensor was recorded. $s_1$ and $s_2$ are preferably defined along the respective pressure tube sensors. $s_1$ and $s_2$ may thus for example specify the distance between the location of the impact and a center of the pressure tube.

In a further preferred embodiment of the method, in step a), respective signals are received from at least two pressure tube sensors that are arranged at a distance from one another at least in the direction of travel of the motor vehicle.

This arrangement is particularly preferred in order to determine the motor vehicle's own speed in step b).

In a further preferred embodiment of the method, in step a), respective signals are received from at least two pressure tube sensors that are arranged at a distance from one another at least transverse to a direction of travel of the motor vehicle.

The two pressure tube sensors are preferably at a distance from one another in a height direction (that is to say in the direction of gravity) and therefore transverse to the direction of travel. This arrangement is particularly preferred in order to determine the minimum size of the collision object in step b).

The two pressure tube sensors are preferably at a distance from one another both in the direction of travel and transverse thereto (in particular in the height direction). In this case, in step b), it is possible to determine in particular both the minimum size of the collision object and the motor vehicle's own speed in the collision.

The direction of travel is understood here to mean the direction in which the motor vehicle moves during normal forward travel. A frontal impact may be recorded firstly by the pressure tube sensor located further toward the front in the direction of travel and also be recorded by the other pressure tube sensor only with a delay. By virtue of the time difference with which the two pressure tube sensors detect the impact, it is possible in particular to determine an impact speed.

From the time difference $\Delta_t = t_2 - t_1$ between the times $t_2$ (pressure increase in the second pressure tube) and $t_1$ (pressure increase in the first pressure tube) and the longitudinal distance d, in the direction of travel, between the two pressure tube sensors, the impact speed $v_{impact}$ may be determined directly as $$v_{impact} = d/\Delta t. \quad (1)$$

In order to be able to make particularly good use of both pressure tube sensors for pedestrian protection, the pressure tube sensors are preferably arranged particularly far toward the front in the motor vehicle (in particular in front of harder crash structures, such as for example crash boxes). A collision object is able to be recorded particularly well when the height of the center of mass (CoM) of the collision object is not closer to the height of the first pressure tube sensor than it is to the height of the second pressure tube sensor. The height of the pressure tube sensors here means a position in the height direction. If the center of mass of the collision object is at a height different from the specified height, the deformation of the second pressure tube sensor may be too small for a reliable detection. Since a collision object relevant to pedestrian protection is generally very lightweight in comparison with a motor vehicle, the collision object is braked at the point of first contact. The center of mass of the collision object will however continue to move at approximately the same speed. This speed corresponds to the impact speed $v_{PTS1}(t_1)$ at the point of first contact $$v_{CoM,x}(t_2) \approx v_{CoM,x}(t_1) = v_{FTS1}(t_1). \quad (2)$$

The collision object will therefore experience a rotational movement. The speed of the upper end of the collision object will increase as a result of this rotation. The speed of the impact point of the collision object at the height of the second pressure tube sensor $z_{PTS2}$ thus depends on a geometrical factor $f_G$ that describes the relationship between the impact speeds at the first pressure tube sensor $v_{PTS1}$ and at the second pressure tube sensor $v_{PTS2}$:

$$v_{FTS2}(t_2) \approx f_G \cdot v_{CoM,x}(t_1) = f_G \cdot v_{PTS1}(t_1) \quad (3)$$

The factor $f_G$ results from the bumper geometry in comparison with the impactor masses relevant to pedestrian protection:

$$f_G = [z_{PTS3} - z_{PTS1}]/[z_{CoM} - z_{PTS1}] \quad (4)$$

This factor is preferably determined individually for each motor vehicle.

The described geometrical observations show that the impact speed, determined from the impact times $t_1$ and $t_2$ according to equation (1), is actually the impact speed on the second pressure tube sensor $v_{PTS2}(t_2)$:

$$v_{PTS2}(t_2) \approx d/\Delta t \quad (5)$$

For a crash with a pedestrian, in which the pedestrian may be assumed to be stationary relative to the motor vehicle, the impact speed at the point of first contact $v_{PTS1}(t_1)$ is equal to the vehicle's own speed $v_{ego}$.

The vehicle's own speed is thereby obtained from the impact speed from $$v_{PTS2}(t_2) \approx f_G \cdot v_{PTS1}(t_1) = f_G \cdot v_{ego} \quad (6)$$

or the vehicle's own speed $v_{ego}$ may be determined from the impact speed determined according to equation (5). In this case, a similar factor $f_G$ may be applied for a wide range of pedestrian objects.

In a further preferred embodiment of the method, in step b), at least the motor vehicle's own speed is determined, wherein the trigger signal for the at least one safety function is output in step c) depending on a comparison between the motor vehicle's own speed determined in this way and a comparison value for the motor vehicle's own speed.

Determining the motor vehicle's own speed in the collision may allow a comparison with the vehicle's own speed, which may be used in pedestrian protection. Since, in the case of an impact with a pedestrian, the collision speed and the vehicle's own speed have to be very similar, other scenarios may be in part ruled out through such a comparison (for example vehicle-to-vehicle crashes or collisions with fast non-trigger objects, such as for example a football).

The motor vehicle's determined own speed in the collision may be used instead of other available information about the vehicle's own speed (available for example in a CAN). As an alternative, the pedestrian protection algorithm may be put into a more robust state in the event of deviations of these vehicle's own speeds, since an impact with a pedestrian is more unlikely. The algorithm itself may be sensitized (increase in sensitivity) or reinforced (increase in robustness) by lowering or raising triggering thresholds in existing trigger logic systems or else by switching to other, more sensitive or more robust trigger logic systems. This procedure may also be referred to as a "path concept".

In a further preferred embodiment of the method, the trigger signal is output in step c) when contact of a collision object with at least two of the pressure tube sensors is detected.

The deformation of the pressure tube sensors in each case leads to an immediate pressure increase and therefore to a pressure signal p at the pressure sensors adjoining the pressure tubes. A pressure threshold may for example be used for both pressure tube sensors in order to detect the minimum size of the collision object. If the pressure threshold is exceeded for both pressure tube sensors, the collision object has a minimum size that corresponds to the vertical distance between the two pressure tube sensors. The vertical distance is measured in the height direction, that is to say from the top downward or from the bottom upward when the motor vehicle is oriented as normal.

Since the pressure strength at both pressure tube sensors may be dependent on speed, the pressure threshold used for detection may also be selected depending on the vehicle's own speed (for example via a CAN). The detection may also be designed as a function of the pressure strength at both pressure tube sensors, wherein a stronger pressure signal at both pressure tube sensors may indicate both a larger and a heavier object. Several levels of influence, or else a continuously stronger influence, are thereby possible.

In a further preferred embodiment of the method, the respective signals from the pressure tube sensors received in step a) comprise at least a respective pressure strength from which a respective impact speed of a collision object on the corresponding pressure tube sensor is determined, wherein the minimum size is determined in step b) at least depending on a respective impact speed determined in this way.

In this embodiment, sizes may in particular be determined depending on the respectively determined impact speed in order to determine the minimum size. The minimum size may then be determined from these sizes.

As a further aspect, what is proposed is a controller for a motor vehicle, which controller is configured so as to perform the described method. The particular advantages and design features described further above for the method are able to be applied and transferred to the controller.

What is furthermore proposed is a computer program that is configured so as to execute all of the steps of the described method. What is additionally proposed is a machine-readable storage medium on which the described computer program is stored. The particular advantages and design features described further above for the method and the controller are able to be applied and transferred to the computer program and the machine-readable storage medium.

BRIEF DESCRIPTION OF THE DRAWINGS

Further details of the disclosure and one exemplary embodiment, to which the disclosure is not however restricted, are explained in more detail with reference to the drawings, in which, in each case schematically.

DETAILED DESCRIPTION

Figure 1:
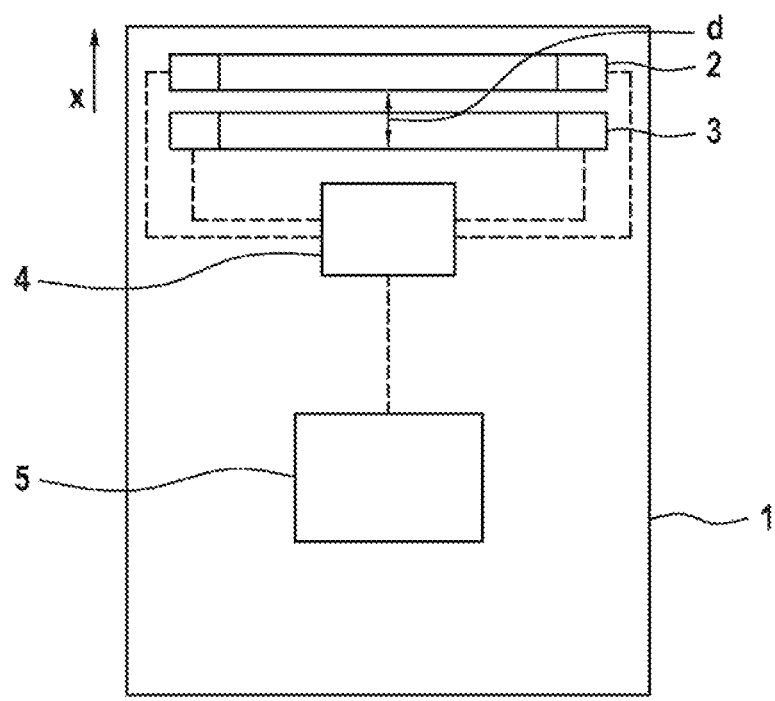
FIG. 1 shows an illustration of a motor vehicle with two pressure tube sensors and that is configured so as to perform the described method.

FIG. 1 shows a motor vehicle 1 with a first pressure tube sensor 2 and a second pressure tube sensor 3. Both pressure tube sensors 2 and 3 are connected to a controller 4. A safety function 5 is able to be triggered by way of the controller 4. Both pressure tube sensors 2 and 3 are arranged at a distance from one another by a distance d in the direction of travel x (from the bottom upward in this illustration).

Figure 2:
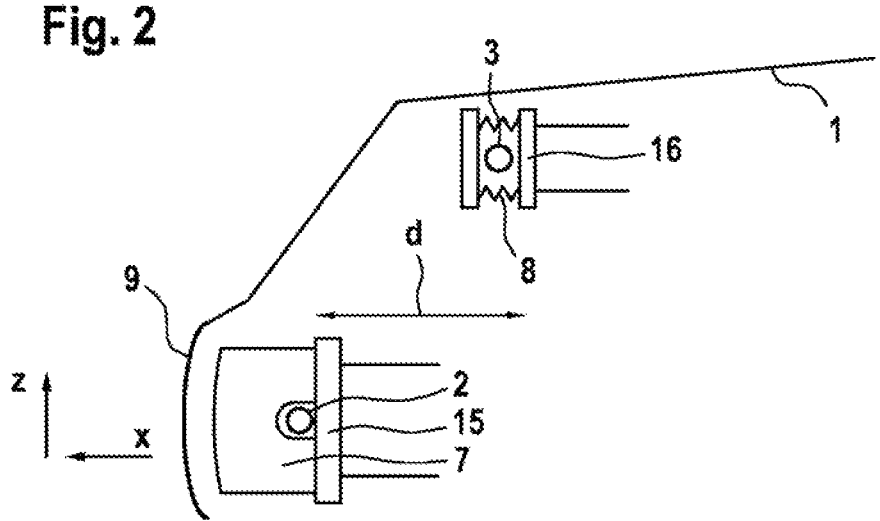
FIG. 2 shows a lateral cross-sectional illustration of the motor vehicle from FIG. 1.

FIG. 2 shows one possible implementation of a 2-PTS system in the motor vehicle 1 from FIG. 1. The first pressure tube sensor 2 is in this case installed, as is conventional, in a bumper 9 in a groove in absorption foam 7 that lies on a crossbeam 15. The second pressure tube sensor 3 is attached to a radiator crossbeam 16 in this example. What is provided in this case as an absorption element 8 (energy absorber) is not a foam, but rather a mechanical element. The specific design is in this case not crucial. The object of the absorption element 8 is merely that of coupling the force onto the second pressure tube sensor 3 in a controlled manner and mechanically protecting same. At least in order to determine a minimum size of a collision object, the pressure tube sensors 2 and 3 do not necessarily have to be arranged at the same distance from the bumper 9 (in the direction from left to right in the illustration). In order to determine the motor vehicle's 1 own speed, on the other hand, it is preferred for the pressure tube sensors 2 and 3 also to be arranged at a distance in the direction of travel (by the distance d as illustrated). The pressure tube sensors 2, 3 are at a distance from one another in a direction transverse to the direction of travel x, that is to say in particular in a height direction z.

Figure 3:
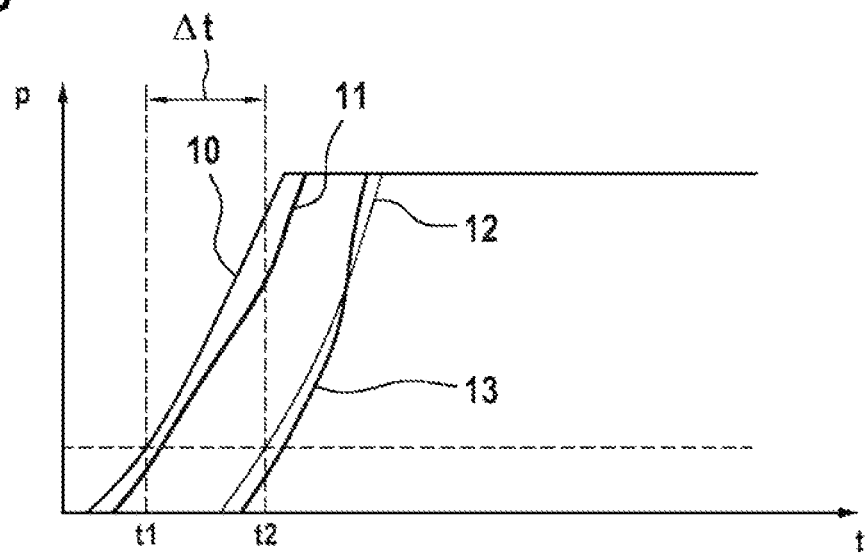
FIG. 3 shows a temporal profile of pressures in the pressure tube sensors of the motor vehicle from FIGS. 1 and 2.

FIG. 3 shows a temporal profile of pressures p in the pressure tube sensors 2 and 3 of the motor vehicle 1 from FIGS. 1 and 2. A first pressure signal 10 is recorded by a left-hand pressure sensor of the first pressure tube sensor 2 and a second pressure signal 11 is recorded by a right-hand pressure sensor of the first pressure tube sensor 2. A third pressure signal 12 is recorded by a left-hand pressure sensor of the second pressure tube sensor 3 and a fourth pressure signal 13 is recorded by a right-hand pressure sensor of the second pressure tube sensor 3. It is able to be seen in particular that the pressure increase in the second pressure tube sensor 3 takes place later than in the first pressure tube sensor 2. The impact times $t_1$ and $t_2$ differ from one another by a time difference $\Delta t$ corresponding to the distance d between the pressure tube sensors 2 and 3. It is furthermore able to be seen that the pressure increase in the respective left-hand pressure sensors takes place earlier. This is due to the fact that the impact location in this example lies to the left of the center of the motor vehicle 1 and the pressure waves accordingly reach the left-hand pressure sensors earlier. This example thus involves a crash on the left-hand side.

Figure 4:
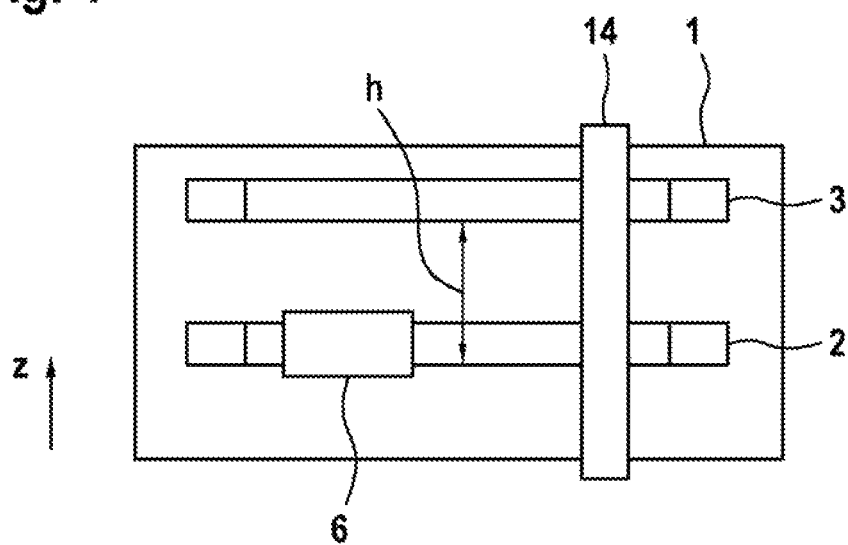
FIG. 4 shows a magnified illustration of the pressure tube sensors of the motor vehicle from FIGS. 1 and 2.

FIG. 4 schematically shows the arrangement of the two pressure tube sensors 2 and 3 of the motor vehicle 1 from FIGS. 1 and 2 in a frontal cross-sectional illustration. The direction of travel x in this illustration points out of the plane of the drawing. A small collision object 6 and a large collision object 14 are illustrated. The small collision object 6 is smaller than the minimum size that is required in order to affect both pressure tube sensors 2 and 3. The small collision object 6 may be for example a football. The large collision object 14 is larger than the minimum size and may therefore affect both pressure tube sensors 2 and 3 at the same time. The large collision object 14 may be for example a pedestrian or the pedestrian's legs. It is able to be seen that the pressure tube sensors 2, 3 are arranged at a distance from one another in the height direction z by a distance h.

Figure 5:
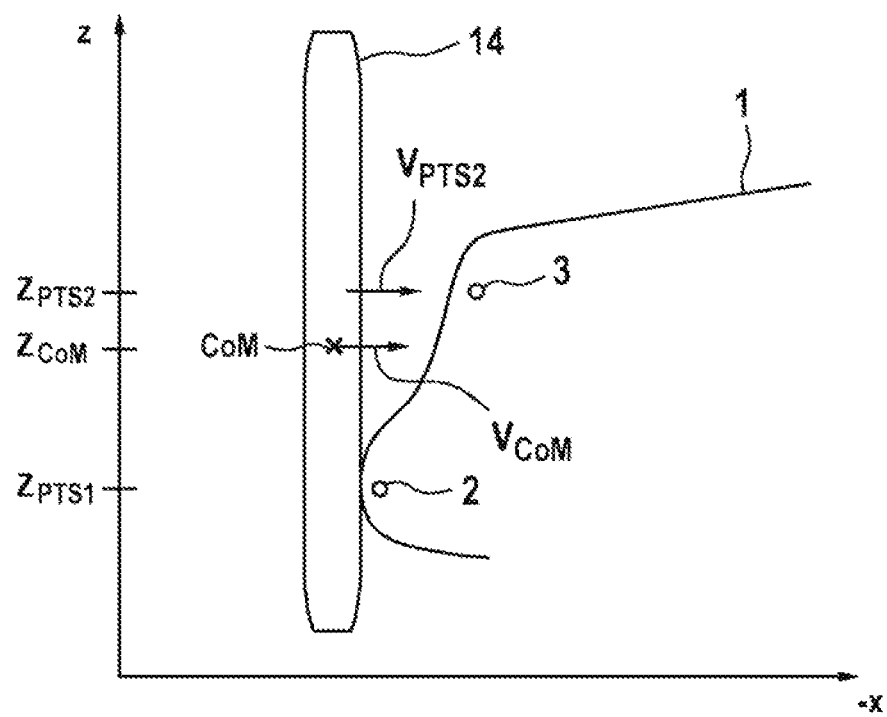
FIG. 5 shows a lateral illustration of a collision of the motor vehicle from FIGS. 1, 2 and 4 with a collision object.

FIG. 5 shows a lateral cross-sectional illustration of the motor vehicle 1 from FIGS. 1, 2 and 4. In this case, the motor vehicle 1 is able to be seen with the pressure tube sensors 2 and 3. For this purpose, a z-axis (for the height direction z) and an x-axis (for the direction of travel x) are illustrated. The x-axis in this case points in the negative x direction and is therefore illustrated as "–x". The first pressure tube sensor 2 is arranged at a height $z_{PTS1}$ below the second pressure tube sensor 3 at a height of $z_{PTS2}$. The large collision object 14 from FIG. 4 is illustrated in front of the motor vehicle 1. The center of mass CoM of the large collision object 14 is located at a height $z_{CoM}$ between $z_{PTS1}$ and $z_{PTS2}$. It is additionally indicated that the center of mass of the large collision object 14 is moving at a speed $v_{CoM}$. $v_{PTS2}$ is the speed of the area of the large collision object 14 that impacts on the second pressure tube sensor 3.

Figure 6:
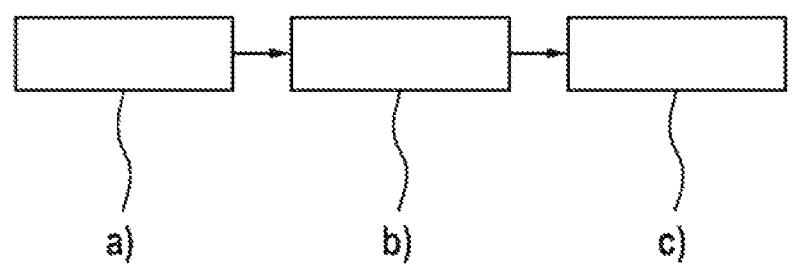
FIG. 6 shows an illustration of the described method.

FIG. 6 is a schematic illustration of a method for generating a trigger signal for triggering at least one safety function 5 of a motor vehicle 1, comprising the following method steps:
a) receiving respective signals from at least two pressure tube sensors 2, 3,
b) determining a minimum size of a collision object 14 and/or the motor vehicle's 1 own speed from the signals received in step a),
c) outputting the trigger signal for the at least one safety function 5 depending on at least one parameter determined in step b).

The invention claimed is:

1. A method for generating a trigger signal for triggering at least one safety function of a motor vehicle, comprising:
receiving respective signals from at least two pressure tube sensors;
determining at least one parameter from the received respective signals; and
outputting the trigger signal for the at least one safety function based on the at least one parameter,
wherein the at least one parameter includes a minimum size of a collision object and/or a speed of the motor vehicle, and
further comprising:
determining from the respective signals from the pressure tube sensors at least a respective pressure strength from which a respective impact speed of a collision object on the corresponding pressure tube sensor is determined; and
determining the minimum size of the collision object at least depending on the respective impact speed.

2. The method as claimed in claim 1, wherein the received respective signals from the at least two pressure tube sensors each represent at least one of an impact time, and an impact location.

3. The method as claimed in claim 1, further comprising:
arranging the at least two pressure tube sensors at a distance from one another at least in a direction of travel of the motor vehicle.

4. The method as claimed in claim 1, further comprising:
arranging the at least two pressure tube sensors at a distance from one another at least transverse to a direction of travel of the motor vehicle.

5. The method as claimed in claim 4, wherein the direction of travel is in a height direction of the motor vehicle.

6. The method as claimed in claim 1, further comprising:
determining at least the speed of the motor vehicle; and
outputting the trigger signal for the at least one safety function based on a comparison between the speed of the motor vehicle and a comparison value for the speed of the motor vehicle.

7. The method as claimed in claim 1, further comprising:
outputting the trigger signal when contact of the collision object with at least two of the pressure tube sensors is detected.

8. The method as claimed in claim 1, wherein a controller for the motor vehicle is configured so as to perform the method.

9. The method as claimed in claim 1, wherein a computer program is configured so as to execute the method.

10. The method as claimed in claim 9, wherein the computer program is stored on a machine-readable storage medium.

* * * * *